United States Patent
Geiger et al.

(10) Patent No.: US 9,091,568 B2
(45) Date of Patent: Jul. 28, 2015

(54) OPTICAL ENCODER SYSTEM INCLUDING A STRUCTURED CODE WHEEL

(71) Applicant: Heptagon Micro Optics Pte. Ltd., Singapore (SG)

(72) Inventors: Jens Geiger, Thalwil (CH); Daniel Reymann, Oberrieden (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 14/518,197

(22) Filed: Oct. 20, 2014

(65) Prior Publication Data

US 2015/0108353 A1 Apr. 23, 2015

Related U.S. Application Data

(60) Provisional application No. 61/893,434, filed on Oct. 21, 2013.

(51) Int. Cl.
*G01J 1/00* (2006.01)
*G01D 5/347* (2006.01)

(52) U.S. Cl.
CPC .......... *G01D 5/34707* (2013.01); *G01D 5/3473* (2013.01)

(58) Field of Classification Search
CPC ..................................... G01J 1/00; G01D 5/34
See application file for complete search history.

(56) References Cited

U.S. PATENT DOCUMENTS

| | | | |
|---|---|---|---|
| 5,017,776 A * | 5/1991 | Loewen | 250/231.14 |
| 5,870,220 A * | 2/1999 | Migdal et al. | 359/216.1 |
| 6,768,101 B1 * | 7/2004 | Lee et al. | 250/231.13 |
| 7,102,123 B2 | 9/2006 | Chin et al. | |
| 7,358,481 B2 | 4/2008 | Yeoh et al. | |
| 2008/0111061 A1* | 5/2008 | Wong et al. | 250/231.13 |

FOREIGN PATENT DOCUMENTS

JP   2003-149006   5/2003

* cited by examiner

*Primary Examiner* — David Porta
*Assistant Examiner* — Faye Boosalis
(74) *Attorney, Agent, or Firm* — Fish & Richardson P.C.

(57) ABSTRACT

An optical encoder system includes a module that has a light emitting element and a light detecting element, wherein the light detecting element is operable to detect light at a wavelength emitted by the light emitting element. The optical encoder system also includes a code wheel that has facets on its surface. Each facet has a surface that provides diffuse reflectance, with adjacent facets being inclined by different amounts. The code wheel can be disposed with respect to the module so that at least some light emitted by the light emitting element is reflected by the facets back toward the module, wherein an amount of reflected light detected by the light detecting element in the module depends at least in part on the rotational position of the code wheel.

20 Claims, 4 Drawing Sheets

OPTICAL ENCODER SYSTEM INCLUDING A STRUCTURED CODE WHEEL

CROSS-REFERENCE TO RELATED APPLICATION(S)

This application claims the benefit of priority of U.S. Provisional Patent Application No. 61/893,434, filed on Oct. 21, 2013, the entire contents of which are incorporated herein by reference.

BACKGROUND OF THE DISCLOSURE

The present disclosure relates to optical encoder systems that include a structured code wheel.

Reflective optical encoders can be used to detect motion, for example, of a rotating code scale (e.g., a cylindrical code wheel) that includes a pattern of stripes to reflect light in a known pattern. Motion of the code scale can be detected optically using a light emitter and a light detector. As the code scale rotates, the intensity of light reflected by the code scale varies. In particular, light is reflected by the pattern on the code scale such that an alternating pattern of light and dark, or high and low intensity, can be detected by the detector. The detected pattern can be converted, for example by a signal processor, into a digital signal that is indicative of the movement, position, direction or velocity of the code scale.

In order to obtain a high quality signal at the light detector, it is desirable that the contrast between the levels of light reflected from the different regions of the code wheel be relatively high. Small changes in the relative positions of the code scale with respect to the light emitter or detector can contribute to a less-than optimal contrast.

SUMMARY

The present disclosure describes an optical encoder system that includes a code wheel having facets on its surface, wherein each facet has a surface that provides diffuse reflectance.

For example, according to one aspect, an optical encoder system includes a module that has a light emitting element and a light detecting element, wherein the light detecting element is operable to detect light at a wavelength emitted by the light emitting element. The optical encoder system also includes a code wheel that has facets on its surface. Each facet has a surface that provides diffuse reflectance, and adjacent facets are inclined by different amounts. The code wheel can be disposed with respect to the module so that at least some light emitted by the light emitting element is reflected by the facets back toward the module, wherein an amount of reflected light detected by the light detecting element in the module depends at least in part on the rotational position of the code wheel.

In some implementations, adjacent facets are inclined in opposite directions from one another. The surface of each facet can be coated with a material that provides the diffuse reflectance. For example, in some instances, the material that provides the diffuse reflectance is selected from a group consisting of: polytetrafluoroethylene, barium sulfate, and titanium dioxide. In some implementations, the facets can be arranged to alternate between facets of a first and facets of a second group, where facets of the first group are coated with a diffusive white material, and facets of the second group are coated with a diffusive black material.

The disclosure also describes a method of operating an optical encoder system.

Other aspects, features and advantages will be apparent from the following detailed description, the accompanying drawings and the claims.

DETAILED DESCRIPTION

This disclosure describes an optical encoder system that includes an optical encoder module and a structured code wheel. An example of the encoder module 10 is described first, followed by a discussion of a structured code wheel 40.

Figure 1:
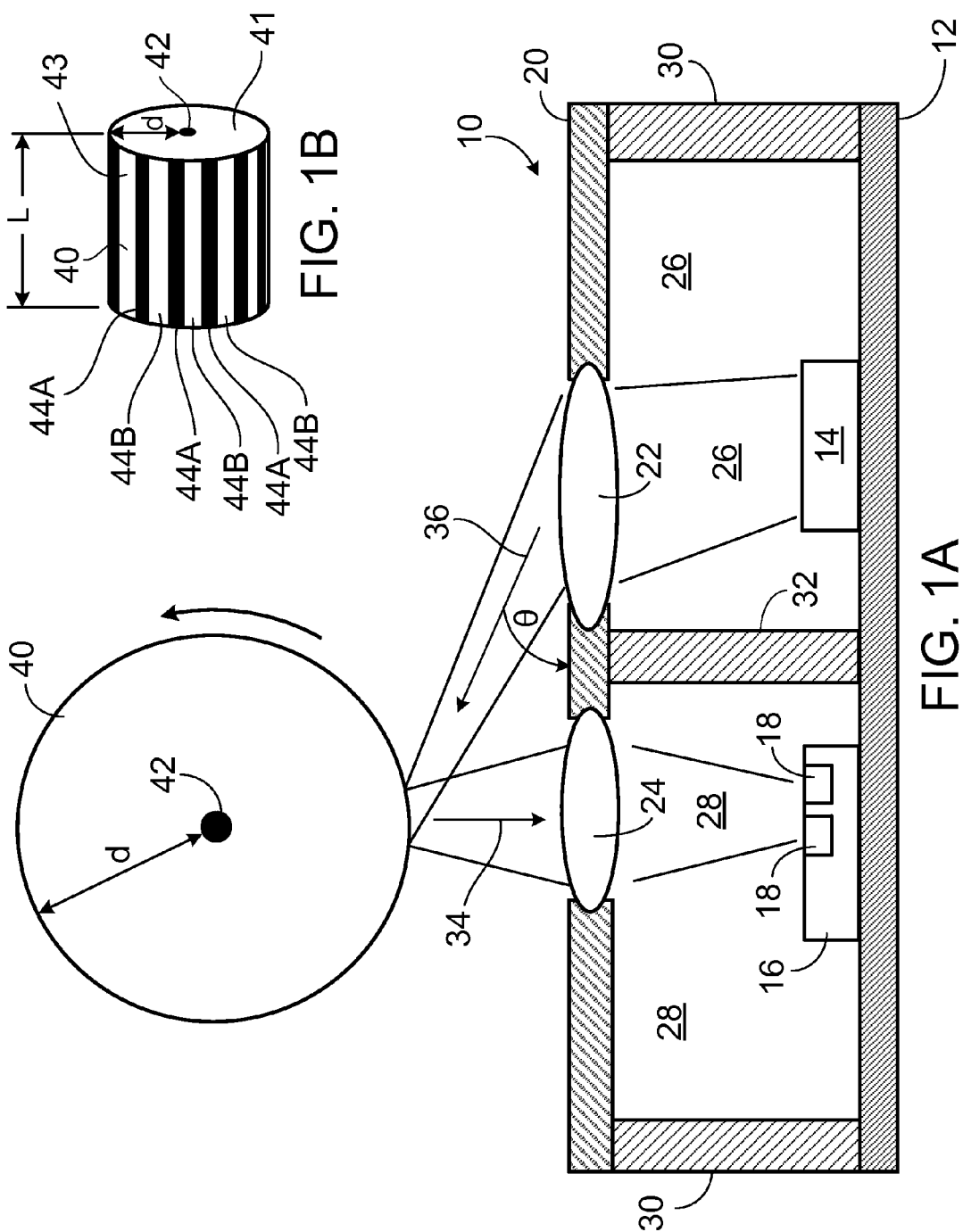
FIG. 1A illustrates an example of an optical encoder system.
FIG. 1B illustrates a perspective view showing an example of a code wheel according to the invention.

As illustrated in FIG. 1A, an optical encoder module 10 includes a substrate 12 on which are mounted a light emitting element chip 14 (e.g., a light emitting diode (LED), a laser diode or a VCSEL) and an integrated circuit chip 16 that has one or more (and in some cases two or more) light detecting elements 18 (e.g., photodiodes, or image sensors such as CMOS or CCD image sensors). The integrated circuit chip 16 includes circuitry for processing signals detected by the light detecting elements 18.

Although the illustrated example of the module 10 shows the integrated circuit chip 16 mounted inside the module 10, in some implementations, the integrated circuit chip 16 can be located outside the module 10, which can help reduce the module's footprint. In such implementations, one or more light detecting elements 18 can be mounted or formed directly on the substrate 12 (i.e., separate from the integrated circuit chip 16). In either case, the module 10 can include a light emitting element 14 and one or more light detecting elements 18 disposed directly or indirectly on the substrate 12.

The light emitting elements 18 may be arranged, for example, in an array. Providing two or more light detecting elements 18 allows the module to detect motion of a rotary code scale 40 (e.g., a code wheel) disposed above the module 10 and to recognize relative angular positions changes over time. If the light emitting element 14 is a laser diode or VCSEL, diffuse reflection from the code scale 40 can produce a speckle pattern that is recorded by the image sensor. For some implementations using speckle pattern detection, only one image sensor may be needed to recognize the direction and speed of the code wheel. The image sensor can record, for example, the direction and distance the image of the pattern moves over time. An advantage of using a speckle pattern detection technique is the extended depth of field (i.e., the image can be relatively "sharp" even if the position of the code wheel moves significantly).

Although not illustrated in FIG. 1A, the outer side of the substrate 12 can include one or more solder balls or other conductive contacts (e.g., pads), which can be coupled electrically, for example, by way of conductive vias extending through the substrate 12, to the light emitting element 14 and the integrated circuit chip 16 (or the light detecting elements 18). These features allow the module 10 to be mounted, for example, to a printed circuit board.

Arranged over the light emitting and light detecting elements 14, 18 is an optics support 20 for one or more passive optical elements 22 aligned with the optical emission channel 26 and one or more passive optical elements 24 aligned with the optical detection channel 28. The substrate 12 and optics support 20 are separated from one another by a spacer 30 that laterally surrounds the optical emission and detection channels 26, 28 and that serves as outer walls for the module 10. The spacer also defines an internal wall 32 that separates the optical emission channel 26 from the optical detection channel 28. The optics support 20, the substrate 12 and the spacer walls 30 define the module housing.

The light detecting elements 18 are arranged to detect a wavelength (or range of wavelengths) of light emitted by the light emitting element 14. In some implementations, light emitting element 14 emits infra-red light. In general, however, the wavelength(s) emitted by the light emitting element 14 can be in the visible or non-visible ranges.

Preferably, the spacer 30, 32 is composed of a material that is substantially non-transparent to light emitted by light emitting element 14 and/or light detectable by the light detecting elements 18. Such an arrangement can help reduce optical cross-talk and optical noise. For example, the spacer 30, 32 can be composed of a polymer material including a non-transparent filler material such as carbon black, a pigment, an inorganic filler or a dye. The substrate 12 and the optics support 20 (other than the passive optical elements 22, 24) also can be composed of non-transparent material. For example, the substrate 12 can be composed of a printed circuit board (PCB) material, such as G10 or FR4, which are grade designations assigned to glass-reinforced epoxy laminate materials. Likewise, the optics support 20 can be composed, for example, of a PCB material with openings for the passive optical elements 22, 24.

The passive optical element(s) 22 for the light emission (i.e., illumination) path can include, for example, a diffractive element, such as a Fresnel lens or a diffuser. The passive optical element(s) 24 for the light detection (i.e., imaging) path can include, for example, one or more aspheric lenses. As illustrated in the example of FIG. 1A, the optical paths for light emission and light detection can be asymmetric. In some cases, the optical detection channel 28 includes a telecentric imaging system. In the illustrated example, the optical elements 24 for the light detection channel 28 are aligned substantially directly over the light detecting elements 18 and is arranged to receive light along a path having a central optical axis 34 that is substantially perpendicular to the plane of the optics support 20. In contrast, the optical elements 22 for the light emission channel 26 are arranged to direct light emitted by the light emitting element 14 along a path having a central axis 36 that forms a non-perpendicular angle (θ) with respect to the plane of the optics support 20.

In general, the angle (θ) between the central axis 36 of the light emission path and the plane of the optic members 20 depends on the distance between the code scale 40 and the encoder module 10, as well as the distance between the light emitting and light detecting elements 14, 18. In some implementations, the angle (θ) is in the range of 20-60 degrees. Such an arrangement can be useful, for example, for a module having overall dimensions on the order of about 1 mm (width)×2 mm (height)×3 mm (length), where the height is measured from the bottom of the module 20 to the center of the shaft 42 for the cylindrical code scale 40. In the illustrated example, the code scale 40 has a diameter (d) of about 1.4 mm (see FIGS. 1A and 1B). In some implementations, the central optical axis for the light emission path intersects the central optical axis for the light detection path at a distance of less than 1 mm from the outer surface of the optics member. Different dimensions for the module 10 and code scale 40 may be appropriate for other implementations.

Figure 2:
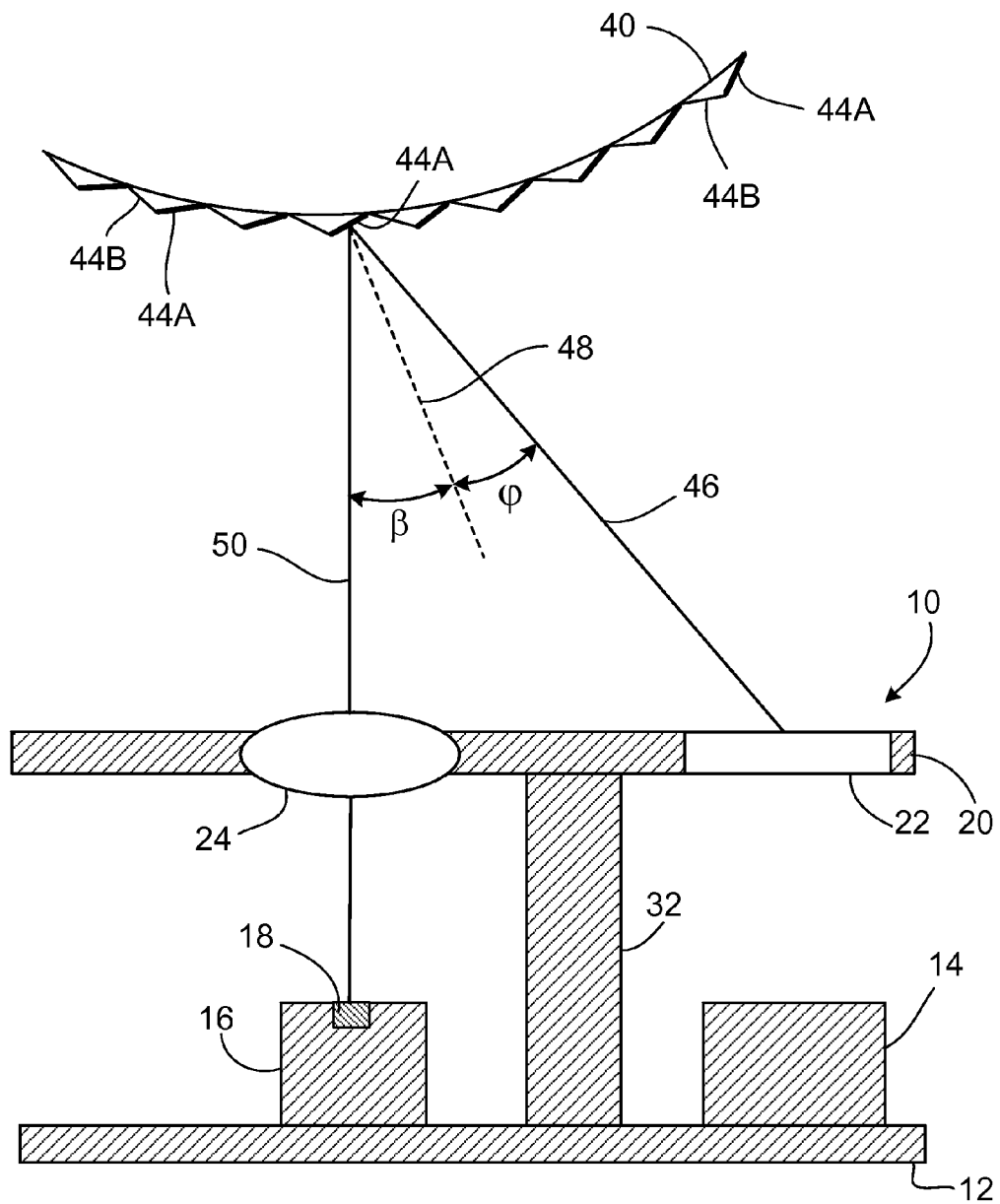
FIGS. 2 and 3 illustrate examples of light being reflected from the code wheel for detection by an optical encoder module.
Figure 3:
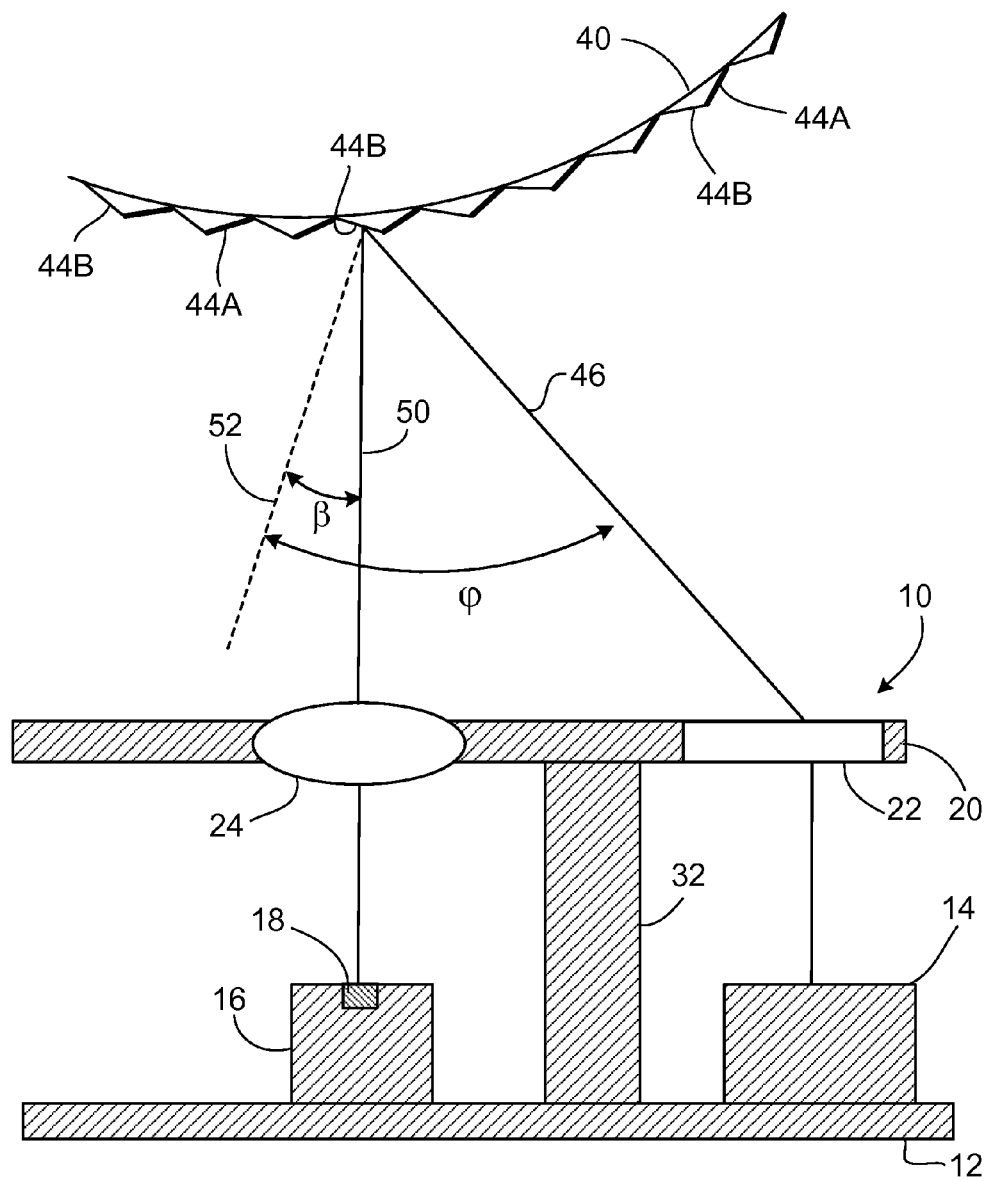
Figure 4:
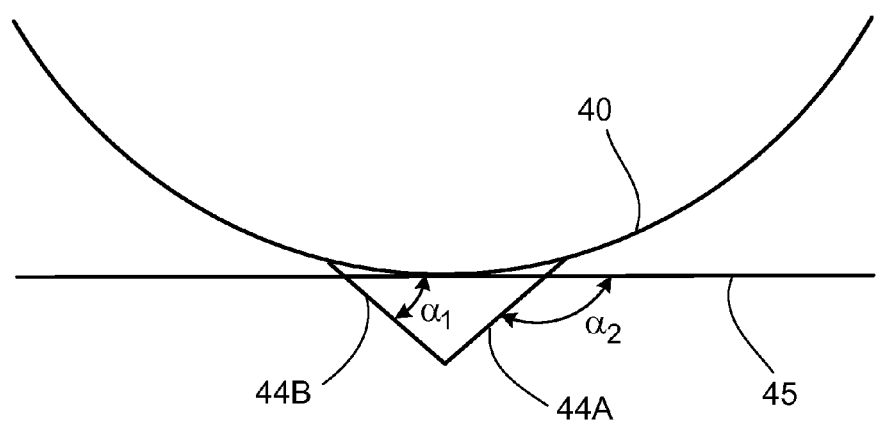
FIG. 4 illustrates further details of the code wheel according to some implementations.

As illustrated in FIG. 1B, the code wheel 40 can be cylindrical-shaped with two substantially flat circular bases 41 and a curved side 43. Instead of a substantially smooth surface, the curved side 43 has a structured surface that includes inclined facets 44A, 44B. Each facet 44A or 44B extends along substantially the entire length (L) of the code wheel. As illustrated in FIGS. 2 and 3, alternate facets 44A, 44B are inclined in opposite directions with respect to one another. Thus, for example, as shown in FIG. 4, if one considers a tangent plane 45 along the curved surface of the code wheel 40 in the vicinity of a pair of adjacent facets 44A, 44B, one of the facets(s) in the pair is inclined at an angle (α1) less than ninety degrees with respect to the tangent plane, whereas the other facet in the pair is inclined at an angle (α2) more than ninety degrees with respect to the tangent plane. In some implementations, the inclinations of the adjacent facets 44A, 44B are symmetrical, such that the angles α1 and α2 are substantially supplementary (i.e., α1 +α2 equals about 180°). Adjacent facets 44A, 44b thus face in opposite directions with respect to a plane that is parallel to the length direction of the code wheel 40 and that is normal to the surface of the code wheel.

The surface of each facet 44A, 44B is a reflective surface. For example, in some implementations, the surface of each facet 44A, 44B approximates a Lambertian surface such that light is reflected diffusely from the surface of the facet. Thus, the reflected luminous intensity preferably behaves roughly in accordance with Lambert's law, in accordance with which the luminous intensity observed from an ideal diffusely reflecting surface is directly proportional to the cosine of the angle θ between the observer's line of sight and the surface normal. The intensity of reflected light will be highest when observed along a direction that is perpendicular to the reflective surface, and will be lowest when observed along a direction that is parallel (or close to parallel) to the reflective surface.

To approximate Lambertian reflectance, the surface of each facet 44A, 44B can be coated or otherwise covered, for example, with any one of various materials. Examples of materials that can be used to coat the surface of the facets 44A, 44B include microstructured polytetrafluoroethylene (PTFE), microstructured barium sulfate ($BaSO_4$), and microstructured titanium dioxide ($TiO_2$).

The number and width of the facets 44A, 44B can vary depending on the particular implementation. However, as an example, assuming the code wheel 40 has a diameter of about 1.4 mm, some implementations include a total of 60-100 facets 44A, 44B (i.e., about 30-50 pairs of facets), each facet having a width of about 44-73 μm. The facets 44B can be coated with the same material as the facets 44A or a different material, but in any event, the surfaces of all the facets 44A, 44B preferably are a highly diffuse reflectance material (i.e., that provides diffuse reflectance at least at the wavelength(s) of light emitted by the light emitting element 14). For example, the facets 44A, 44B can be coated, respectively, with a first highly diffusively reflective white material and a second highly diffusively reflective black material.

The optical encoder system can operate, for example, in a diffuse reflectance mode. The code wheel 40 can be arranged with respect to the encoder module 10 such that when light from the module is incident on one of the facets 44A, light having a relatively high intensity is reflected toward the module's light detection channel 28 such that the light detecting element(s) 18 detect a light level that corresponds to a digital high signal (see FIG. 2). Conversely, when light from the module is incident on one of the facets 44B, light having only a relatively low intensity is reflected toward the module's light detection channel 28 such that the light detecting element(s) 18 detect a light level that corresponds to a digital low signal (see FIG. 3). Thus, the facets 44A can serve as maximally visible surfaces in which a significant amount of the light is scattered toward the light detecting elements 18 in the encoder module 10, whereas the facets 44B can serve as minimally visible surfaces in which only a small amount of the light is scattered toward the light detecting elements 18.

The amount of light reflected per unit area depends, in part, on the angle of incidence of the light emitted by the light emitting element 14 toward the code wheel 40. For example, a high angle of incidence will tend to result in a relatively high amount of reflected light per unit area, whereas a shallow angle of incidence will tend to result in less reflected light per unit area.

FIG. 2, for example, illustrates light 46 from the module 10 incident on one of the facets 44A of the code wheel 40 at a relatively high angle of incidence (e.g., $\phi=20°$), where the line 48 indicates the normal to the facet surface. The relatively high angle of incidence results in a relatively high intensity of diffuse reflectance, such that the amount of light diffusely reflected along a light detection path 50 (e.g., $\beta=20°$) for detection by the light detecting elements 18 is relatively high (i.e., the amount of detected light is interpreted as a digital high value). Conversely, FIG. 3 illustrates light 46 from the module 10 incident on one of the facets 44B of the code wheel 40 at a relatively low angle of incidence (e.g., $\phi=58°$), where the line 52 indicates the normal to the facet surface. The low angle of incidence results in a relatively low intensity of diffuse reflectance, such that the amount of light diffusely reflected along a light detection path 50 (e.g., $\beta=18°$) for detection by the light detecting elements 18 is relatively low (i.e., the amount of detected light is interpreted as a digital low value).

As the code wheel 40 rotates about the shaft 42, the intensity of the light reflected back toward the light detection element(s) 18 in the module 10 varies. The integrated circuit chip 16 can be configured to process signals from the light detection element(s) 18 and to determine the movement, position, direction and/or velocity of the code scale 40, which may be coupled, for example, to a motor or other apparatus that causes the code wheel to rotate.

Using a code wheel 40 having facets 44A, 44B whose surfaces are coated with a highly diffuse reflectance material can improve the system tolerances. For example, if the code wheel 40 moves slightly from its ideal position with respect to the module 10, providing facets with highly diffuse reflectance material on their surfaces can make the system less sensitive to such movements.

In the illustrated example, the optical path from the emitter channel 26 and the optical path to the detector channel 28 are asymmetric. Providing a module 10 having asymmetric optical paths can allow a relatively simple optical design to be implemented for the light detecting optics, while also allowing for greater mechanical tolerances in the position of the code scale 40 relative to the module 10. For example, for the specific module dimensions mentioned previously, the tolerances for the position of the code scale's shaft 42 can be on the order of about 100 microns (μm) up to several hundred μm in the horizontal (x) and vertical (z) directions, where the nominal distance between the outer circumference of the code scale 40 and the encoder module 10 is in the range of 500 μm-1 mm. The tolerances, as well as the nominal distance between the code scale and the encoder 10, may be different for other implementations.

Although particular examples are described above, various modifications can be made. Thus, other implementations are within the scope of the claims.

What is claimed is:

1. An optical encoder system comprising
   a module that includes a light emitting element and a light detecting element, wherein the light detecting element is operable to detect light at a wavelength emitted by the light emitting element; and
   a code wheel including a plurality of facets on its surface, wherein adjacent facets are inclined by different amounts, each facet having a surface that provides diffuse reflectance, and wherein the facets are comprised of a first group and a second group, wherein the facets alternate between the first and second groups in a direction around a central axis of the code wheel, and
   wherein the code wheel is disposed with respect to the module so that at least some light emitted by the light emitting element is reflected by the facets back toward the module, wherein an amount of reflected light detected by the light detecting element in the module depends at least in part on the rotational position of the code wheel.

2. The optical encoder system of claim 1 wherein adjacent facets are inclined in opposite directions from one another.

3. The optical encoder system of claim 1 wherein the code wheel has a cylindrical shape and wherein each facet extends along a length direction of the code wheel.

4. The optical encoder system of claim 1 wherein a surface of each facet is coated with a material that provides diffuse reflectance.

5. The optical encoder system of claim 4 wherein the material that provides the diffuse reflectance is selected from a group consisting of: polytetrafluoroethylene, barium sulfate, and titanium dioxide.

6. The optical encoder system of claim 1 wherein the module has optical emission and detection paths that are asymmetric with respect to the code wheel.

7. The optical encoder system of claim 1
   wherein when light from the light emitting element is incident on a facet from the first group, the facet reflects light that is detected by the light detecting element at a first intensity level, and
   wherein when light from the light emitting element is incident on a facet from the second group, the facet reflects light that is detected by the light detecting element at a second different intensity level.

8. The optical encoder system of claim 1 wherein the facets of the first group are coated with a diffusively reflective white material, and the facets of the second group are coated with a diffusively reflective black material.

9. The optical encoder system of claim 1 wherein each facet has a width in a range of 44-73 μm.

10. An optical encoder system comprising
    a module that includes a light emitting element and a light detecting element, wherein the light detecting element is operable to detect light at a wavelength emitted by the light emitting element; and
    a code wheel including a plurality of facets on its surface, wherein the code wheel has a cylindrical shape and wherein each facet extends along a length direction of the code wheel, wherein the facets are comprised of facets in a first group and a second group, wherein the facets are disposed around a central axis of the code wheel in an alternating pattern of facets from the first group and the second group, wherein adjacent facets are inclined by different amounts from one another, each facet having a surface that approximates a Lambertian reflective surface, wherein the code wheel is disposed with respect to the module so that light from the module impinges on a facet from the first group at a first angle of incidence, and so that light from the module impinges on a facet from the second group at second angle of incidence shallower than the first angle of incidence.

11. The optical encoder system of claim 10 wherein the surface of each facet is comprised of a material selected from a group consisting of: microstructured polytetrafluoroethylene, microstructured barium sulfate, and microstructured titanium dioxide.

12. The optical encoder system of claim 10 wherein the surface of each facet in the first group is coated with a first diffusely reflective material and the surface of each facet in the second group is coated with a second diffusely reflective material different from the first diffusely reflective material.

13. The optical encoder system of claim 10 wherein adjacent facets are inclined in opposite directions from one another.

14. A method of operating an optical encoder system, the method comprising:
(a) emitting light from an encoder module toward a code wheel, wherein the code wheel has a plurality of facets comprising facets in a first group and a second group, wherein the facets are disposed around a central axis of the code wheel in an alternating pattern of facets from the first group and the second group, wherein adjacent facets are inclined by different amounts from one another;
(b) reflecting light from a first facet on the code wheel, wherein the first facet belongs to the first group and has a diffusely reflective surface;
(c) detecting in the module a first amount of light reflected by the first facet;
(d) emitting more light from the module toward the code wheel;
(e) reflecting light from a second facet on the code wheel, wherein the second facet belongs to the second group, is adjacent the first facet, and has a diffusely reflective surface; and
(f) detecting in the module a second amount of light reflected by the second facet, wherein (a) through (f) are performed with respect to a first pair of adjacent facets and then for a second pair of adjacent facets.

15. The method of claim 14 wherein emitting light from the encoder module includes emitting infra-red light.

16. The method of claim 14 wherein the code wheel is disposed with respect to the encoder module so that light from the module impinges on the first facet at a first angle of incidence, and so that light from the module impinges on the second facet at second angle of incidence shallower than the first angle of incidence.

17. The method of claim 14 wherein the facets of the first group are coated with a diffusively reflective white material, and the facets of the second group are coated with a diffusively reflective black material.

18. The method of claim 14 the surface of each facet is coated with a material selected from a group consisting of: polytetrafluoroethylene, barium sulfate, and titanium dioxide.

19. The method of claim 14 wherein each facet has a width in a range of 44-73 μm.

20. The method of claim 14 wherein light is emitted from the module toward the code wheel along an optical emission path, and light is reflected from the code wheel back toward the module along an optical detection path, wherein the optical emission and detection paths are asymmetric with respect to the code wheel.

* * * * *